No. 739,661. PATENTED SEPT. 22, 1903.
T. FORSTNER.
SNAP HOOK.
APPLICATION FILED MAR. 25, 1903.
NO MODEL.

Witnesses
Harry L. Ames.
Herbert D. Lawson.

Inventor
Thomas Forstner.
By Victor J. Evans
Attorney.

THE NORRIS PETERS CO., PHOTO-LITHO., WASHINGTON, D. C.

No. 739,661. Patented September 22, 1903.

UNITED STATES PATENT OFFICE.

THOMAS FORSTNER, OF NEW ULM, MINNESOTA.

SNAP-HOOK.

SPECIFICATION forming part of Letters Patent No. 739,661, dated September 22, 1903.

Application filed March 25, 1903. Serial No. 149,572. (No model.)

*To all whom it may concern:*

Be it known that I, THOMAS FORSTNER, a citizen of the United States, residing at New Ulm, in the county of Brown and State of Minnesota, have invented new and useful Improvements in Snap-Hooks, of which the following is a specification.

My invention relates to new and useful improvements in snap-hooks; and its object is to provide a simple, durable, and inexpensive device of this character having means whereby the dog may be locked in closed position, so as to prevent the accidental withdrawal of any object which may have been placed into engagement with the hook.

A further object is to provide means whereby the dog can be readily unlocked when it is desired to depress the same.

With the above and other objects in view the invention consists in providing a hooked plate having a slot in one end for the reception of a ring, which may be connected to a strap or any other suitable device. A dog is pivoted to one face of the plate and has a slot formed in the rear portion thereof and normally registering with the slot in the plate. The dog is held in contact with the hook of the plate by means of a spring suitably arranged between said dog and the plate, and this spring also serves to act upon a device for holding the link before referred to in proper position in relation to the dog, so as to lock the dog in closing position.

The invention also consists in the further novel construction and arrangement of parts hereinafter more fully described and claimed, and illustrated in the accompanying drawings, in which—

Figure 1:
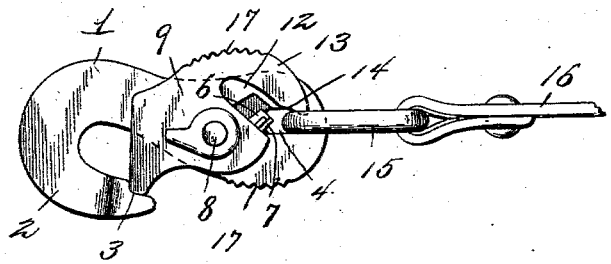
Figure 2:
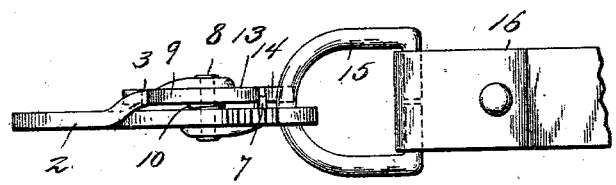
Figure 3:
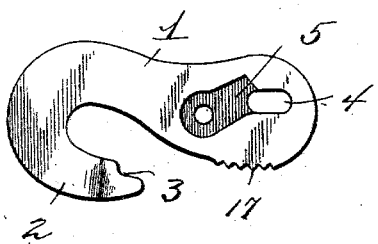
Figure 4:
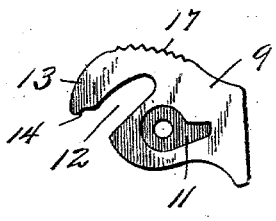
Figure 5:
Figure 6:
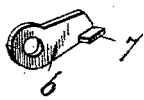

Figure 1 is a side elevation of my improved snap-hook. Fig. 2 is an edge view thereof. Fig. 3 is a detail view of the hooked plate of the snap-hook. Fig. 4 is a similar view of the dog. Fig. 5 is a perspective view of the spring used in connection with the device; and Fig. 6 is a perspective view of the intermediate dog used in connection with the spring.

Referring to the drawings by numerals of reference, 1 is a plate having a hook 2 at one end thereof, preferably cut away, as shown at 3. A longitudinally-extending slot 4 is formed within the end of the plate farthest removed from hook 2, and adjacent to the inner end of this slot is formed a recess 5. Pivoted within this recess is a small intermediate dog 6 having a laterally-extending lug 7 at its free end, said end projecting normally over the inner end of slot 4. The pivot-pin 8 of dog 6 extends through the locking-dog 9 of the snap-hook, said locking-dog being held normally in contact with the recessed end 3 of hook 2 by a coiled spring 10, which incloses pin 8 and bears at opposite ends upon lug 7 and one wall of a recess 11, formed within the inner face of dog 9 adjacent to the pivot thereof. A slot 12 is formed diagonally within the outer end of dog 9 in rear of its pivot 8, and this slot extends over the longitudinally-extending slot 4 before referred to. The arm 13 formed by slot 12 is cut away at its free end, as shown at 14, so as to bear upon a link or ring 15, which is slidably mounted in slot 4 and is connected to a strap or other suitable device. The laterally-projecting edges of the plate 1 and dog 9 are serrated, as shown at 17, so as to permit the dog 9 to be readily retracted after it has been unlocked. When it is desired to depress dog 9, it is first necessary to press ring 15 longitudinally within slot 4, so as to bring it into contact with the intermediate dog 6. This dog serves to hold the ring in the path of arm 13, and in order to remove it out of said path it is obvious that the dog 6 must be pressed inward. When the inward movement of ring 15 has been completed, dog 9 can be retracted from the end of hook 2 by drawing backward upon the serrated edge 17 thereof. This will cause spring 10 to be tensioned, and as soon as the dog is released said spring will throw it back into normal position and will at the same time cause dog 6 to throw the ring 15 back into the path of the arm 13. Said dog 9 will thus be locked in closed position, and in order to again depress it it is necessary to repeat the operation above described.

In the foregoing description I have shown the preferred form of my invention; but I do not limit myself thereto, as I am aware that modifications may be made therein without departing from the spirit or sacrificing any of the advantages thereof, and I therefore reserve the right to make such changes and alterations as may fall within the scope of my invention.

Having thus described my invention, what I claim as new, and desire to secure by Letters Patent, is—

1. In a snap-hook the combination with a slotted plate having a hook at one end; of a dog pivoted to the plate and means slidably mounted within the slot for locking the dog in closed position.

2. In a snap-hook, the combination with a longitudinally-slotted plate having a hook at one end; of a dog pivoted upon the plate and normally bearing upon the hook; an arm integral with the dog, and means within the slot of the plate normally in the path of said arm and adapted to lock the dog against movement upon its pivot.

3. In a snap-hook the combination with a longitudinally-slotted plate having a hook at one end; of a spring-pressed dog pivoted to the plate and normally contacting with the hook, an arm to said dog, a spring-pressed intermediate dog pivoted to the first-mentioned dog, and means slidably mounted within the slotted plate normally held in the path of the arm by the intermediate dog.

4. In a snap-hook the combination with a recessed longitudinally-slotted plate having a hook at one end; of an intermediate dog pivoted within said recess and extending over the slot, a recessed dog pivoted upon the plate and extending over the intermediate dog, a spring within the recess in the dog and bearing upon the intermediate dog, said spring serving to hold the recessed dog normally in contact with the hook, an arm upon the recessed dog and a ring slidably mounted within the slot and held normally in the path of the arm by the intermediate slot.

In testimony whereof I affix my signature in presence of two witnesses.

THOMAS FORSTNER.

Witnesses:
  WM. PFAENDER, Jr.,
  RUDOLPH PFAENDER.